Figure 1:
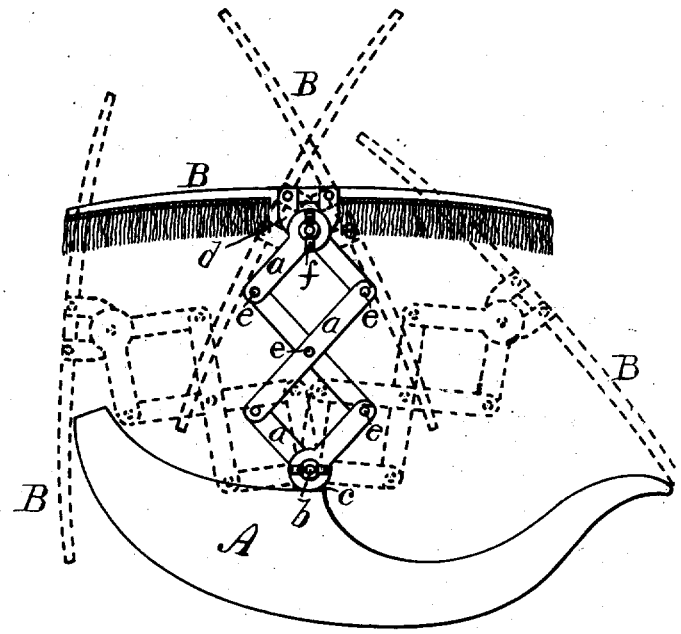

F. L. HUGHES.

Children's Carriage.

No. 8,417. Reissued Sept. 17, 1878.

Attest:
F. B. Hutchinson.
L. K. Pash.

Inventor:
F. L. Hughes.
By E. B. Whitmore, Atty.

N. PETERS, PHOTO-LITHOGRAPHER, WASHINGTON, D. C.

UNITED STATES PATENT OFFICE.

FRANCIS L. HUGHES, OF ROCHESTER, NEW YORK.

IMPROVEMENT IN CHILDREN'S CARRIAGES.

Specification forming part of Letters Patent No. 154,757, dated September 8, 1874; Reissue No. 8,417, dated September 17, 1878; application filed July 5, 1878.

*To all whom it may concern:*

Be it known that I, FRANCIS L. HUGHES, of Rochester, in the county of Monroe and State of New York, have invented a new and useful Improvement in the Method of Hanging Carriage-Tops, which improvement is fully set forth in the following specification and accompanying drawing, in which the figures are similar side elevations of a carriage-body and top or canopy having my improved hangers or supports attached.

My invention is designed to be more especially applicable to children's carriages; and the object is to provide a simple and cheap support for the top or canopy, by means of which the same may be adjusted to any desired position vertically, as well as to the front or rear, and be fixed at any degree of inclination; and its nature consists in the employment of a system of jointed lattice-bars, to the top of which the canopy is hinged.

The drawing shows but one side of a carriage, one system of lattice-bars only appearing. The parts of the side not shown are exact duplicates of those shown.

In the drawing, A is the body of a child's carriage, and B the canopy. *c* are shanks rigidly attached to the body-sides, to which are pivoted, by means of clamp-screws *b*, the systems of lattice-bars or "lazy-tongs" *a*. At the top the lattices are similarly pivoted, by clamp-screws *f*, to yokes *d*, rigidly fastened to the sides of the canopy.

It will be understood that by means of the pivot-joints at *b* the lattices with the supported canopy may be swung forward or backward, as shown by dotted positions in Fig. 1, and that by means of the pivot-joints at *f* the canopy may be tilted to any desired position relative to the lattices, also shown by dotted positions, its motion, by means of the two pivot-joints described, being universal as far as positions in a single plane are concerned.

Figure 2:
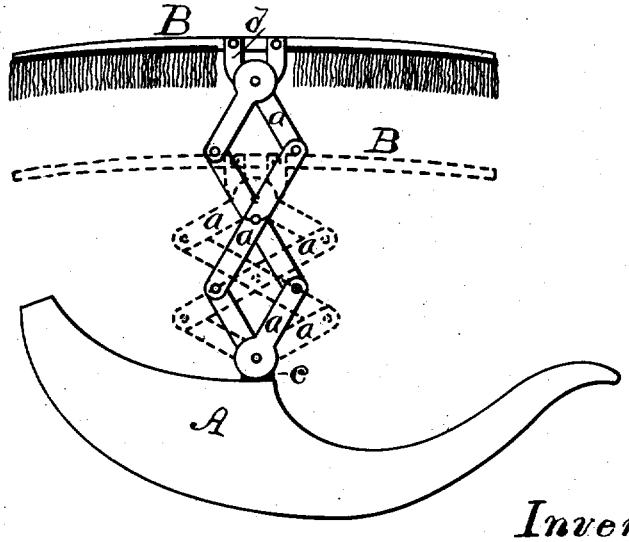

The lattice-bars are freely pivoted at the several points *e*, by means of which the systems may be elongated to elevate the canopy, as shown in Fig. 2, or depressed to lower the same, as shown in dotted position. The clamp-nuts *b* serve to hold the lattices in any position of adjustment, while the clamp-nuts *f* serve to stay the canopy at any desired position.

The canopy may be thrown to one or the other side to a limited distance and tilted laterally by elongating one lattice and compressing the other.

The contiguous faces of the bars *a*, held together by the clamp-screws *b* and *f*, may be roughened or corrugated for the better holding of the same in position. The usual side curtains may be readily adapted to this construction of carriage, if desired.

I am aware that the canopies of children's carriages have heretofore been rigidly fastened to the top of supports, they occupying the same relative position with said supports, whether the same are swung forward or back, as shown in the patent numbered 143,421, dated October 7, 1873. Such a combination I do not claim.

What I claim as my invention, and wish to secure by Letters Patent, is—

1. In combination with the body and top of a child's carriage, the lazy-tongs suspension-braces, as and for the purpose set forth.

2. The systems of jointed lattice-bars *a*, forming canopy-supports, in combination with a jointed or tilting canopy, substantially as described.

3. Canopy side supports for a child's carriage, pivoted at one end to the sides of the body and at the other end to the sides of the canopy, and capable of being elongated or shortened at pleasure in the direction of their lengths, by means substantially as described, whereby the canopy may be brought nearer to or caused to recede from the body.

FRANCIS L. HUGHES.

Witnesses:
E. B. WHITMORE,
F. B. HUTCHINSON.